UNITED STATES PATENT OFFICE.

FRANCIS MUDIE SPENCE, OF MANCHESTER, ENGLAND.

PROCESS OF TREATING SEWAGE FOR OBTAINING FERTILIZERS.

SPECIFICATION forming part of Letters Patent No. 622,401, dated April 4, 1899.

Application filed October 1, 1898. Serial No. 692,409. (No specimens.)

*To all whom it may concern:*

Be it known that I, FRANCIS MUDIE SPENCE, manufacturing chemist, a subject of the Queen of the United Kingdom of Great Britain and Ireland, and a resident of Old Trafford, Manchester, in the county of Lancaster, England, have invented a new and useful Improvement in the Treatment of Sewage, of which the following is a specification.

This invention consists in an improvement in the treatment of "sewage," in which term I include any liquids containing putrescible excrementitious substances and soapy or fatty matters.

The sewage discharged from many towns is of such a character that after its putrescible substances have been precipitated in tanks by the mixture of aluminic sulfate and ferric sulfate (known as "aluminoferric") it yields an effluent which, if used for irrigation, tends to clog or choke up the land to which it is applied, being charged with soapy or fatty matters remaining in it in consequence of the sulfuric acid of the precipitant being insufficient in amount to neutralize all the alkali of such soapy or fatty matter.

The objects of my invention are (*a*) the production of a tank effluent which shall be so clear, neutral, and, practically speaking, free from soapy or fatty matters that it may be applied as a liquid fertilizer to irrigable land year after year without any fear of clogging it up, and so enable the advantages of land filtration to be secured without the difficulties hitherto experienced; (*b*) the recovery of the fatty matter from the sewage, and (*c*) the production of a manure better than that ordinarily produced from the putrescible matter of sewage.

According to this invention, I treat sewage with a mixture of aluminic sulfate and ferric sulfate and also with sulfuric acid in such proportions that the alkalinity of the liquid is completely neutralized, as indicated, by methyl-orange in the way well known to chemists, whereupon the fat or fatty acid of the soapy or fatty matters is precipitated along with the putrescible matter. The mixture of aluminic sulfate and ferric sulfate is preferably such that the aluminic sulfate largely preponderates over the ferric sulfate; but I may use, on the one hand, a mixture containing a very small proportion of ferric sulfate, or, on the other hand, a mixture containing only a very small proportion of aluminic sulfate, and I find that the mixture of aluminic sulfate and ferric sulfate (ordinarily known in commerce as "aluminoferric," and which contains about fourteen per cent. of alumina and three-quarters of one per cent. of ferric oxid in combination with sulfuric acid and water) is efficient for the purposes of my invention. I find that from ten to twenty hundredweight of aluminoferric and about twelve to eighteen hundredweight of sulfuric acid of a specific gravity of 1.7 are suitable quantities for the precipitation and neutralization of a million gallons of ordinary town sewage; but the quantities of the material necessarily vary with the degree of impurity and of alkalinity of the sewage as ascertained by tests from time to time. The aluminoferric may be used, as is well known, either in the form of slabs placed in the conduit delivering the sewage into the precipitating-tanks or of a regulated stream of the material in solution. The acid may be delivered in the form of a regulated stream near the same point. After the addition of the mixture of aluminic sulfate and ferric sulfate and the acid the precipitated portion or sludge is separated from the clear liquid or effluent by any suitable means.

The precipitated portion or sludge is freed or practically freed in any suitable manner, as by pressing and drying, from the water associated with it. The dried sludge is then treated in a suitable vessel with a suitable solvent, as ether or bisulfid of carbon or petroleum-spirit, with the object of dissolving out the fat or fatty acid contained in such dried sludge. The resultant liquid, consisting of the solvent used and the fat or fatty acid dissolved therein, is then separated by any suitable means, as by filtration, from the insoluble solid portion. The fat or fatty acid dissolved in such liquid is then separated from the solvent by any suitable means, as by distillation, which will enable the solvent to be recovered for further use. The fat or fatty acid may then be utilized for any purpose for which it may be suitable either in the form in which it may be after separation from the solvent or after being subjected to any purification which may be requisite.

The portion of the sludge which was insoluble in the solvent used contains phosphoric acid and nitrogenous matter, and after drying it in any suitable way free from the solvent and taking care to recover the latter for further use utilize the said insoluble portion of the sludge as a manure. Unlike the dried sludge produced by precipitation from a highly-alkaline sewage without neutralization, which contains a portion of fatty acid in combination with the lime originally present in the sewage, the dried sludge obtained by my hereinbefore-described process is free from fatty matter, and is thus not only enriched in phosphoric acid and nitrogenous matter, but is freed from a constituent which is injurious to it as a manure.

The effluent, freed, as above described, not only from the putrescible substances, but also from the fatty matter and containing all the valuable nitrogenous constituents of the sewage which were not precipitated in the sludge, is now in the very best condition to be further purified by application to irrigable land in large quantities year after year without any tendency to choke or clog up such land.

My process applies only to alkaline sewages containing more alkali than can be netralized by the sulfuric acid present in the mixture of aluminic sulfate and ferric sulfate required to precipitate their putrescible matter.

What I claim as my invention is—

1. The process of treating sewage consisting in adding to the sewage sufficient of a mixture of aluminic sulfate and ferric sulfate and sufficient sulfuric acid to complete the neutralization of the alkalinity of the sewage and separating the precipitated putrescible and fatty matters from the liquid, all as hereinbefore described.

2. The process of treating sewage consisting in adding to the sewage sufficient of a mixture of aluminic sulfate and ferric sulfate and sufficient sulfuric acid to complete the neutralization of the alkalinity of the sewage, separating the precipitated putrescible and fatty matters from the liquid, pressing and drying the precipitated putrescible and fatty matters, treating them with a solvent to dissolve out the fat or fatty acid, separating the insoluble solid fertilizing portion from the solvent and its dissolved fat or fatty acid, separating the fat or fatty acid from the solvent and recovering both the solvent and the fat or fatty acid, all as hereinbefore described.

In testimony that I claim the foregoing as my invention I have signed my name, in presence of two witnesses, this 21st day of September, 1898.

FRANCIS MUDIE SPENCE.

Witnesses:
HOWARD CHEETHAM,
JAMES BOAM MILNER.

Correction in Letters Patent No. 622,401.

It is hereby certified that in Letters Patent No. 622,401, granted April 4, 1899, upon the application of Francis Mudie Spence, of Manchester, England, for an improvement in "Processes of Treating Sewage for Obtaining Fertilizers," an error appears in the printed specification requiring correction as follows: On page 2, line 11, after the word "use" the pronoun *I* should be inserted; and that the said Letters Patent should be read with this correction therein that the same may conform to the record of the case in the Patent Office.

Signed, countersigned, and sealed this 2d day of May, A. D., 1899.

[SEAL.]
                WEBSTER DAVIS,
                *Assistant Secretary of the Interior.*

Countersigned:
 C. H. DUELL,
  *Commissioner of Patents.*